United States Patent
Wisor et al.

(10) Patent No.: US 6,173,395 B1
(45) Date of Patent: Jan. 9, 2001

(54) MECHANISM TO DETERMINE ACTUAL CODE EXECUTION FLOW IN A COMPUTER

(75) Inventors: Michael Wisor; Travis Wheatley; Dan S. Mudgett, all of Austin, TX (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/135,493

(22) Filed: Aug. 17, 1998

(51) Int. Cl.$^7$ ..................................................... G06F 15/00
(52) U.S. Cl. .......................... 712/236; 712/233; 712/234; 712/238; 712/241; 712/227
(58) Field of Search ..................... 712/227, 233, 712/236, 234, 238, 241

(56) References Cited

U.S. PATENT DOCUMENTS

| | | | |
|---|---|---|---|
| 5,784,604 | * 7/1998 | Muhich et al. | 712/238 |
| 6,009,270 | * 12/1999 | Mann | 395/704 |
| 6,094,729 | * 7/2000 | Mann | 714/25 |

* cited by examiner

Primary Examiner—Daniel H. Pan
Assistant Examiner—Dzung G Nguyen
(74) Attorney, Agent, or Firm—Conley, Rose & Tayon, PC; B. Noël Kivlin

(57) ABSTRACT

A method and system for determining the sequence of execution of instructions in a computer under test using trace data generated upon execution of certain ones of the instructions. In one embodiment, the method comprises locating an initial entry in the trace data and scanning the instructions in program order beginning with an instruction indicated by the initial entry. When a branch instruction is encountered, the trace data is examined to determine the subsequently executed instruction. If the branch is unconditional, a corresponding address entry in the trace data indicates the address of the next instruction. If the branch is conditional, a corresponding bitmap entry in the trace data contains a bit which indicates whether the branch was taken. From this bit and the instructions themselves, the next instruction is determined. The bitmap entry contains a series of bits, each of which can indicate whether a conditional branch was taken, so that a single bitmap entry can represent a series of conditional branches.

15 Claims, 4 Drawing Sheets

MECHANISM TO DETERMINE ACTUAL CODE EXECUTION FLOW IN A COMPUTER

CROSS-REFERENCE TO RELATED APPLICATION

This application relates to co-pending application, Ser. No. 09/135,065, filed on the same day as the present application and entitled "METHOD FOR VERIFYING BRANCH TRACE HISTORY BUFFER INFORMATION" by Travis Wheatley, Michael Wisor and Christopher Gray, which is incorporated herein by reference.

BACKGROUND OF THE INVENTION

1. Field of the Invention

The invention relates generally to means for testing microprocessors and more specifically to devices and methods for recording significant trace events in the execution of a software program in a trace history buffer and then using the trace history buffer to reconstruct the sequence of execution of the programs instructions.

2. Description of the Relevant Art

There are numerous problems involved in the development of integrated circuits (ICs) and devices which use ICs. Because of the increasing speed and complexity, as well as the decreasing size of ICs, designers face decreased access to the products for testing and increased amounts of time to perform the tests. It is becoming more and more difficult to test and debug the design and operation of these products but, when a new processor design is implemented, it must be debugged to ensure that it operates as expected. (Debugging is the process of finding and eliminating problems, or bugs, in hardware or software.)

Many of the designers' problems arise from the difficulty of using traditional testing at the IC level, board level and system level. The complexity of testing using traditional methods has grown commensurately with the complexity of the products themselves. For example, a large portion of the time required to implement a new microprocessor design is spent on debugging the design. The increased costs and the time required to debug and test can cause delays which disrupt manufacturing flows and hinder manufacturers' efforts to bring the products to market. Testing methods which can offset the complexity of the products are therefore desirable.

The time and expense associated with traditional testing methods have lead to the development of what are known as "design for test" methods. Design for test (DFT) methods actually comprise both design methodologies and testing methodologies. DFT methodologies incorporate certain design rules and techniques and also include implementation of specific test-related structures to allow for greater ease of testing. DFT methodologies may be implemented at IC, board and system levels. The facilitation of testing through DFT methodologies allows thorough testing of products which might otherwise be prohibitively expensive or time consuming. The use of DFT methodologies, although increasing the length of the design cycle and the cost of designing the products, results in overall time and cost savings because of improved capability to debug, test and maintain the products.

Individual manufacturers' implementations of embedded test circuitry have varied. Some manufacturers have chosen to use proprietary techniques and structures. The use of individualized and restricted implementations, of course, may be limited. In order to allow DFT methodologies to be more widely utilized and more efficient, some manufacturers have attempted to develop standards relating to DFT methodologies in order to allow the use of less specialized, less costly equipment and greater reuse of previously developed test data.

DFT methodologies can be used in conjunction with more traditional test methods and tools. Debugging tools may therefore be external to the processor, internal to the processor, or a combination of both. The external tools may include software debuggers and hardware tools such as logic analyzers. The inclusion of internal debug features, or even more general features which simply facilitate debugging within a processor, can be very helpful to the designer and manufacturer of the processor. They can also be helpful to developers of hardware and software which will be used in connection with the processor.

One method for debugging a microprocessor is to execute a known application or a simple piece of test code on the microprocessor and then observe the results to determine whether the code executed correctly. The results which should be produced by the test code are known. The code is executed and the results are compared to the anticipated results. If the test code produces a correct result, the microprocessor is assumed to have operated properly. Any incorrect or inconsistent results indicate that the microprocessor has functioned in error.

When execution of the test code produces an incorrect output, this output may result from improper execution of any one of the instructions in the code. It is therefore useful to be able to observe execution of each of the instructions or to trace the sequence of instruction which is executed. By observing the execution of each instruction, it can be determined whether the test code executed in the expected manner or whether, for example, the code took a branch which should not have been taken. The identification of these branches which are taken in error can help the designer determine the design error which lead to the taking of the branch.

Some prior art debugging applications allow the user to track execution of a piece of test code. These debugging applications typically execute the test code line by line and display information related to the instructions so that the user can track the execution of the test code. The applications may also display particular information about the system as each instruction is executed. For example, the application may show the contents of various registers to the user. Using these applications, a user can determine the sequence of instructions which were executed in the test code and can thereby determine whether the microprocessor is functioning as intended.

Prior art debugging applications can be stopped at selected points in the execution of the code by setting breakpoints or by allowing a certain number of instructions to be executed. The user may thereby be able to step through the test code, one instruction at a time. One of the problems with this type of debugging is that the application cannot back up to a previously executed instruction. That is, it cannot undo one or more previous instructions. If the user wishes to determine the exact sequence of instructions which led to the current point in the test code's execution, the user must re-execute the test code until it reaches the point of interest. This re-execution of the test code can result in wasted time and processing bandwidth, particularly if the test code is large or if it requires a great deal of time to execute.

SUMMARY OF THE INVENTION

These and other problems in the prior art are in large part solved by the present invention. The invention utilizes a branch trace history buffer (BTHB) to enable the user to trace the sequence of execution of instructions in the test code. The microprocessor is configured to store entries corresponding to the execution of control instructions and other significant trace events in a BTHB. ("Trace events" are instructions for which information is stored in the BTHB) Conditional branch information is stored in bit maps in the BTHB, while entries for most other trace events are stored as logical addresses. Non-control instructions are not recorded in the BTHB.

When a test program is executed, a trace record is generated and stored in the BTHB. The trace record consists of full entries and bitmap entries. The full entries are generated for unconditional branches and other significant trace events. ("Full" entries, as used herein, are those entries which each correspond to a single branch or trace event.) The full entries contain information relating to the target addresses of the branches. The bitmap entries are generated for a series of conditional branches and contain individual bits which represent the taken or not-taken status of the branches.

In one embodiment, after execution of the test code, the contents of the BTHB and the test code are retrieved into the test station. The BTHB contents and test code may also be accessed in their respective storage devices in the system under test. The BTHB contents are parsed and the number of conditional branches represented by the bitmaps in the BTHB are compared to the number of conditional branches in the code to verify that the BTHB is consistent with the code. The target address of unconditional branches may also be compared to the addresses stored in corresponding BTHB entries to ensure that the addresses match. In an alternate embodiment, no verification of the BTHB entries is performed.

The BTHB contents are scanned by the debug software to locate an initial unconditional branch entry. This entry is recorded in the BTHB when tracing is begun. The initial BTHB entry includes an address which is the location of the first instruction to be traced and therefore provides a starting point for the reconstruction of the sequence of execution of the instructions in the test code. From this starting point, the instructions of the test code are scanned in program order until an instruction representing a significant trace event is encountered. When such an instruction is found, the debug software checks the BTHB entries to determine the effect of the instruction.

If the instruction is an unconditional branch, the debug software reads the next BTHB entry (because, during normal execution, this instruction would have generated an entry.) The next entry, which is an unconditional branch entry, will include an address which is the target of the branch. This target address is the address of the next instruction in the execution sequence. The debug software then begins scanning the test code for another significant branch event.

If a conditional branch is encountered, the debug software reads the next bit in the corresponding bitmap entry. If the previous trace event was not a conditional branch, the next entry in the BTHB should be a bitmap entry. Each bitmap entry, however, may contain information corresponding to a number of conditional branches. The encountered branch corresponds to the first bit in the bitmap. If the first bit is a 1, the branch was taken. The debug software will determine the next instruction from the conditional branch instruction itself If the first bit is a 0, the branch was not taken and the debug software can simply continue with the next instruction in program order. If the trace event which preceded the conditional branch was another conditional branch, then the debug software had already read a bitmap to determine whether that branch had been taken. If less than all the bits in the bitmap have been used to determine whether conditional branches have been taken, the next bit is used to determine whether the current branch was taken. If all of the bits have been used, the next entry (also a bitmap entry) will be used for the current branch.

If the trace event is a change to a descriptor table register rather than a conditional or unconditional branch, the next entry from the BTHB is read and the new value of the register is stored. The scanning of the test code then resumes with the next instruction in program order. Although these trace events do not alter the sequence of execution of the instructions in the test code, they affect the determination of the correct address for unconditional branch entries and must therefore be tracked.

BRIEF DESCRIPTION OF THE DRAWINGS

Other objects and advantages of the invention will become apparent upon reading the following detailed description and upon reference to the accompanying drawings in which.

Figure 1:
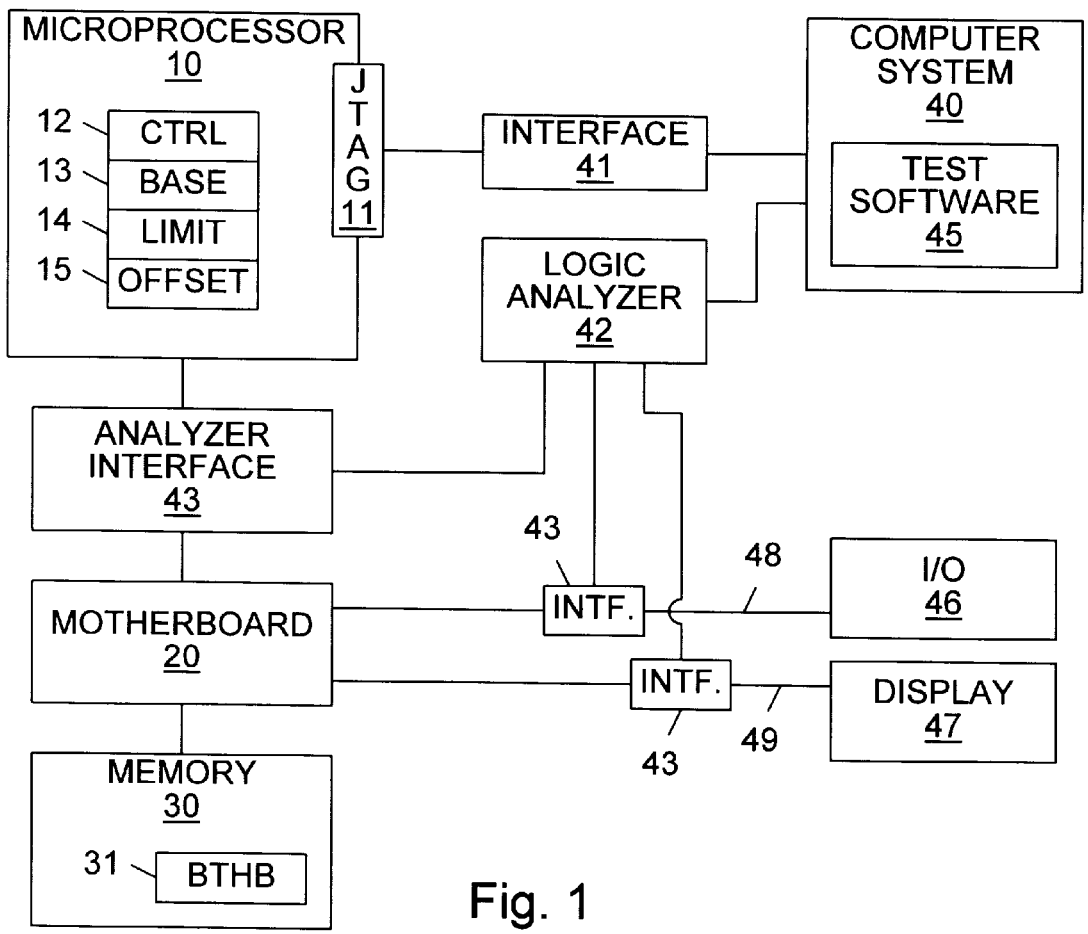
FIG. 1 is a block diagram illustrating the setup of a microprocessor implementing a BTHB and the associated test hardware.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention will be described in detail below. This embodiment utilizes a BTHB to store data relating to the execution of particular instructions in the code of a test program. The stored data identifies whether or not certain branches in the test program were taken and provides address information on other significant trace events. Jumps, calls, returns and other trace events which cause execution to resume with an instruction other than the next instruction in program order are considered branch instructions for the purpose of this disclosure. Changes to the global descriptor table register, the local descriptor table register, the interrupt descriptor table register or the system control register CR3 are trace events which generate entries in the BTHB, but do not cause a branch to an instruction other than the next instruction in program order. The information stored in the BTHB is sufficient to determine the sequence of instructions executed in the test program.

Referring to FIG. 1, the setup of a microprocessor implementing a BTHB and the associated test hardware is shown. Microprocessor 10 is part of the system under test. Microprocessor 10 includes BTHB-related registers 12–15. BTHB control register 12 contains data relating to the tracing of data and recording of entries in the BTHB. Base register 13 contains the starting address of the BTHB and limit register 14 contains the ending address of the BTHB. Offset register 15 contains the address of the next entry in the BTHB and always has a value between those of the base and limit registers 13 and 14. Microprocessor 10 is coupled to motherboard 20 via one of the logic analyzer interfaces 43. Additional interfaces 43 are coupled to I/O devices 46 via PCI bus 48 and display devices 47 via AGP bus 49. Logic analyzer 42 need not be used, but it allows the user to obtain bus information which will enable additional analysis of the system. Memory 30 is coupled to motherboard 30. BTHB 31 is allocated within memory 30 and is accessed by microprocessor 10 in the same manner as the remainder of memory 30.

The test hardware, or test station, includes computer system 40 and interface hardware 41, which couples computer system 40 to microprocessor 10. Interface hardware 41 is coupled to microprocessor 10 at test port 11. In one embodiment, test port 11 is configured according to IEEE Standard 1149.1-1990, IEEE Standard Test Access Port And Boundary Scan Architecture in order to provide means for instructions and data to be directly read into and out of microprocessor 10 by computer system 40. Interface hardware 41 accordingly uses the IEEE 1149.1 protocol to communicate via port 11. Interface hardware 41 communicates with computer system 40 via parallel port, USB or such other protocol as is suitable for the particular system. (Because interface hardware 41 essentially translates a set of input signals to corresponding output signals, it may not be required in some embodiments in which the signals do not need to be altered.) Computer system 40 may be a personal computer or a system specifically adapted to the microprocessor test setup. In one embodiment, computer system 40 is coupled to logic analyzer 42. Logic analyzer 42 is used to capture memory, input/out (I/O) and memory mapped I/O from microprocessor 10 for use by computer system 40. A memory image can also be extracted from microprocessor 10 via JTAG port 11. Test software 45 is executed by computer system 40 and controls its functionality.

Microprocessor 10 is configured to execute a program, detect significant trace events, and record entries in BTHB 31 for those events. Computer system 40 has control over the recording of the trace events to the extent that it sets the values of the various fields in control register 12. Microprocessor 10 records the trace events according to the settings of control register 12, but does not require any active support from computer system 40. After microprocessor 10 completes execution of the program (or as much of the program as the user wishes to trace,) BTHB 31 contains entries corresponding to the traced portion of the program. The BTHB entries (and memory contents, if desired) can be retrieved by computer system 40 and analyzed. Microprocessor 10, with motherboard 20, memory 30 and the remainder of the system under test, may be removed from the test setup, as they are not necessary for the analysis of the trace data. Other testing can therefore be conducted in parallel with the trace analysis.

The program instructions executed by a microprocessor can be broken up into sets of instructions called basic blocks. A basic block is a sequence of instructions which have the property that, if the first instruction in the basic block is executed, each of the instructions in the basic block will be executed. Basic blocks end with a branch instruction. When tracing execution of a program, it is not necessary to record every instruction in a basic block because execution of one instruction in the block indicates execution of all the instructions in the block. Tracing execution of the program therefore only requires that it be determined which branch is taken and its target address at the end of each basic block. The target address indicates the start of the next basic block to be executed.

The tracing of a test program using the BTHB facility of the microprocessor thus involves detecting the branch instructions and recording information regarding the branch which will allow the instruction executed immediately after the branch to be identified. The information is stored as an entry in the BTHB. The format of a BTHB entry in one embodiment of the invention is illustrated in FIG. 2.

Figure 2:
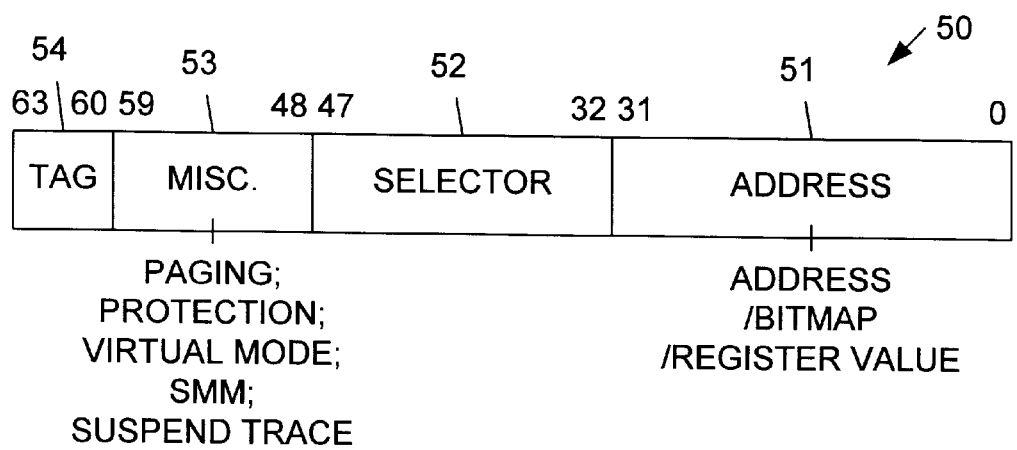
FIG. 2 is a diagram illustrating the format of a BTHB entry in one embodiment of the invention.

FIG. 2 shows that each BTHB entry 50 comprises 64 bits. The high-order 4 bits (63:60) are a tag 54 which identifies the type of branch or event which corresponds to the entry. For example, a hexadecimal 0 may indicate a synchronization entry, while a hexadecimal 2 may indicate a jump or a call. The low order 32 bits (31:0) are used as an address field 51 for unconditional branches. Although this field is referred to as an address field, it can be used to identify the logical address of the next sequential instruction (or target instruction), to store a value entered in one of the microprocessor registers, or to represent a sequence of conditional branches which are taken or not taken, depending on the type of BTIB entry. If a series of conditional branches is indicated, the next higher 16 bits (47:32) are not used. If the low order 32 bits indicate a logical address, the next higher 16 bits identify a selector 52 for the code segment in which the target address is located. (The logical address consists of the selector and an offset which is specified in the low-order 32 bits.) The remaining bits (59:48) are used for other information 53, such as whether paging or protection are enabled, whether virtual or SMM modes are enabled, what the default operating mode is and whether tracing should be suspended on recording of the entry. This remaining information is referred to herein as "miscellaneous" entry information.

In the case of unconditional branches, such as jumps, calls and returns, address field 51 of the BTHB entry contains a target address and selector field 52 contains the code segment selector for the target address. In one embodiment, the target code segment selector is included in the entry if the target address is in a code segment other than the currently executing segment. Unconditional jumps whose target addresses are dependent only upon the contents of the current code segment do not require a trace entry at all. The fact that these unconditional jumps do not cause BTHB entries to be written has a significant impact on the size of the BTHB. This not only eliminates these entries, but also prevents some unfilled bitmap entries from being written to the BTHB.

In the case of conditional branches, the instructions immediately following each branch can be identified simply by an indication of whether or not the branch was taken. Conditional branches can therefore be represented by a one-bit record. Since conditional branches can be represented in this manner, it would be inefficient to store information on these branches in the same way as unconditional branches. Conditional branch information is therefore compressed and represented as a bitmap. That is, a series of consecutive conditional branches is represented as a series of consecutive bits in a single entry in the BTHB. Because the vast majority of the branches encountered in a program are conditional branches, the representation of these branches with a single bit per branch greatly reduces the amount of storage space required for the trace information as compared to trace mechanisms which record full-length entries for each of the branches.

One embodiment of the invention uses a 32-bit bitmap to record conditional branch information. The bitmap is filled from the highest order bit to the lowest. The 32 bits of the bitmap occupy address field 51 of the BTHB entry (the low order 32 bits of he 64-bit entry.) The 16 bits of selector field 52 are not used in bitmap entries. The bitmap entries do, however, include tag information 54 to identify them as bitmap entries, and they include the same miscellaneous information 53 as the other entries.

Since the number of consecutive conditional branches encountered in a program most likely will not exactly match the number of bits in the bitmap, bitmap entries each include a stop bit (in this case a 1) after the last bit which corresponds to an encountered branch. All the bits which follow the stop bit are 0's. Thus, a single bitmap entry can record data for up to 31 conditional branches.

When a conditional branch is encountered in the test program following an unconditional branch or other event which causes a BTHB entry to be recorded, a new bitmap is started. As consecutive conditional branches are encountered, a bit is set in the bitmap for each of these branches. If another unconditional branch or trace event occurs before the bitmap is filled, a stop bit is entered in the bitmap and the bitmap entry is recorded in the BTHB. An entry for the unconditional branch or trace event is then recorded in the BTHB. If a bitmap is filled before another unconditional branch or trace event is encountered in the program, the bitmap entry is recorded in the BTHB. A subsequent conditional branch will cause a new bitmap to be started.

Figure 3:
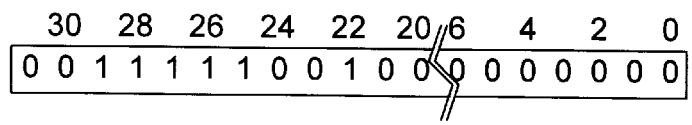
FIG. 3 is an example of a bitmap as used in this embodiment of the invention.

FIG. 3 shows an example of a bitmap as used in this embodiment of the invention. In the figure, bits 0 through 21 are 0's. Bit 22 is the lowest order 1 and can therefore be identified as the stop bit. Since bit 22 is the stop bit, each of bits 23 through 31 must correspond to a conditional branch. In this example, 1's represent taken branches and 0's represent not-taken branches. It can therefore be determined from the bitmap that the first two branches were not taken, the next five were taken, and the next two were not taken. After the last of these conditional branches, a trace event other than a conditional branch occurred, causing the stop bit to be inserted in the bitmap and causing the bitmap to be written to the BTHB.

Since conditional branches are so much more prevalent than other types of trace events, it is possible that a large number of bitmap entries could be generated. This could present a problem because there needs to be an unconditional branch record in the BTHB in order to enable verification of the BTHB data against the program code based on the trace information. As a result, one embodiment automatically generates and records a synchronization entry in the BTHB if fifteen consecutive bitmap entries are recorded without any intervening unconditional branch entries.

As noted above, significant trace events other than conditional and unconditional branches are recorded in the BTHB. One type of significant trace event is a change to one of the address-related registers. More particularly, changes to the global descriptor table register (GDTR), the local descriptor table register (LDTR), the interrupt descriptor table register (IDTR) or the system control register CR3 will cause a BTHB entry to be written. Changes to these registers result in BTHB entries because they control the segmentation and paging mechanisms. It is important to record these trace events because they affect the interpretation of the other entries in the BTHB.

For example, in an x86 architecture, a BTHB entry for a particular jump includes an address and a code segment selector. Because the code segment selector is indexed into a global descriptor table identified by the GDTR, a change to the GDTR represents a change in the global descriptor table and a corresponding change in memory addressing. Therefore, in order to properly interpret the addresses recorded in the BTHB, it is necessary to know whether the basis for the addresses in the segmentation and paging mechanisms has changed since the corresponding entries were recorded. BTHB entries for changes to the GDTR, LDTR, IDTR and CR3 registers contain the newly stored data values in address field 51 instead of an instruction address. Other types of events for which entries are recorded in the BTHB include interrupts and exceptions. BTHB entries for these events can include target addresses and interrupt vectors In one embodiment, the recording of information in the BTHB is based on data stored in a control register. The information in the control register defines various parameters of the operation of the BTHB. The control register governs when tracing is started and stopped, which code is traced, which privilege levels are traced, what happens when the BTHB is filled, and so on. Tracing can be set to start immediately or upon reaching one of the breakpoints in the test program. Tracing can be set to stop upon reaching a breakpoint or when the BTHB is full. The buffer can be set to wrap around so that the oldest entries are overwritten by the newest entries, or it can be set to generate an interrupt. Various other options may also be set via the fields of the control register.

Figure 4:
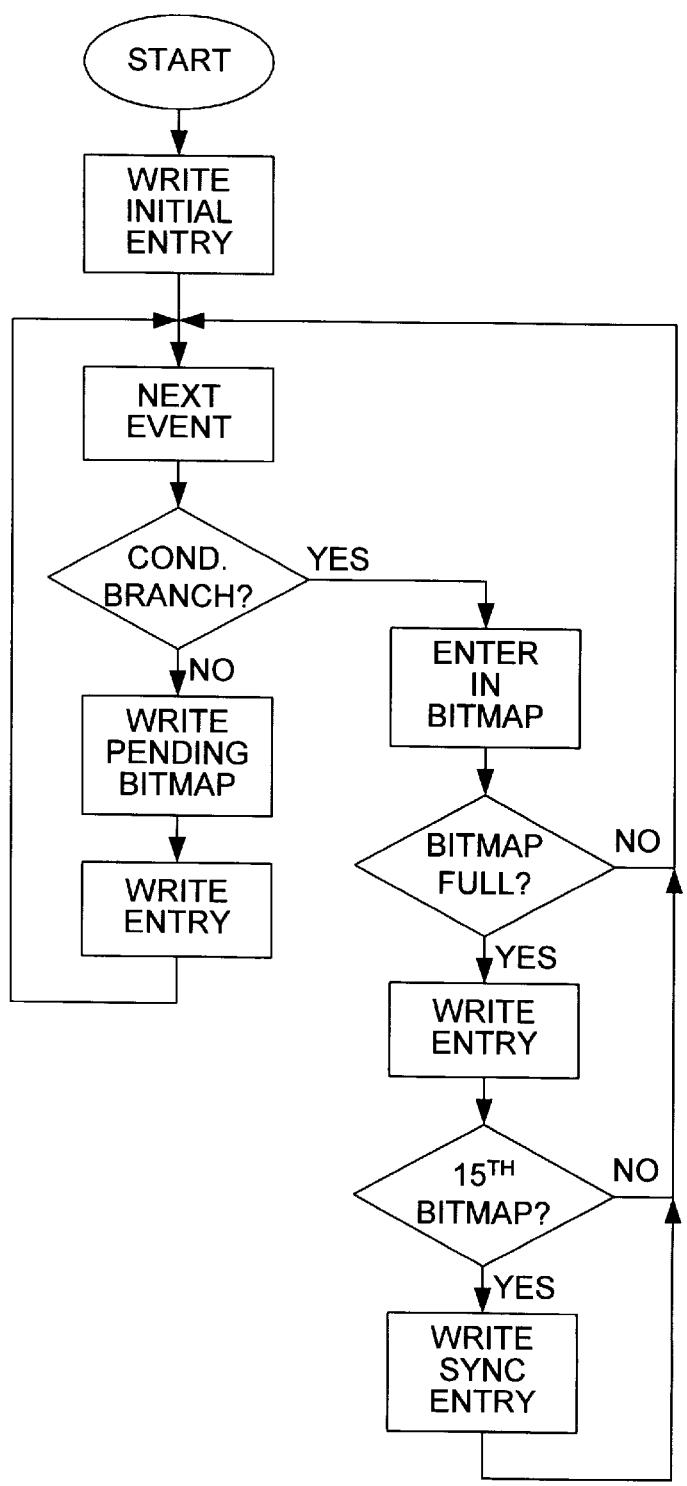
FIG. 4 is a flow diagram illustrating the generation of entries in the BTHB.

When the tracing facility is turned on, the microprocessor automatically stores an initial entry in the BTHB. This initial entry is necessary because reconstruction of the trace from the information in the BTHB requires an address for the first instruction in the traced code. In order to allow the trace to be started at an arbitrary point in the code, the BTHB facility must provide an initial entry with an initial address. After the recording of the initial entry, the microprocessor begins recording entries as described above for the conditional and unconditional branches and the other significant trace events encountered during execution of the test program. For the purposes of this discussion, the initial entry can be treated as an unconditional branch entry. A flow diagram illustrating the generation of the BTHB entries is shown in FIG. 4.

In one embodiment, the BTHB is a circular buffer. The entries can therefore wrap around if the buffer is full (or tracing may be stopped when the buffer is full, depending on the data stored in the control register.) The location of the BTHB is stored in a base register and its size is determined by the difference between the base register and a limit register (the limit register stores the address which is the upper limit of the buffer.) In one embodiment, the size of the BTHB is constrained to multiples of 4 k bytes. The location of the next entry in the BTHB is determined by adding the contents of the base register with the contents of an offset register.

The BTHB registers are initialized by a debug program according to the user's needs. (As described above, the test station and debug program are interfaced to the system under test via a JTAG port in the microprocessor.) A program is then executed on the test microprocessor. As a result of the program's execution, data may be stored in memory and entries are recorded in the BTHB. The user can reconstruct the sequence of assembly code instructions which were executed by the program using the BTHB entries and memory data. In alternate embodiments, a program listing in a high level language (e.g., C++) may be used to reconstruct the sequence of instructions in that language.

After a program is executed on the system under test, the contents of the BTHB are retrieved into the computer system of the test station. In addition to the BTHB contents, the computer system retrieves an indication of which is the last entry in the BTHB. Likewise, the computer system receives an indication of which is the last instruction to be executed during the trace. Beginning with the last instruction and the last trace entry, the BTHB contents are checked to determine whether the number of bits in the bitmaps between consecutive full BTHB entries matches the corresponding number of conditional branches in the instruction sequence. If the numbers match, the BTHB entries are assumed to accurately reflect the code flow of the program. If the numbers do not match, then the BTHB does not accurately reflect the code flow and can be disregarded by the user. In another embodiment, the BTHB data is not checked before the execution sequence of the instructions is determined. If the user is confident that the BTHB data is accurate, the verification of the data may be skipped and the time required for the process avoided.

Figure 5:
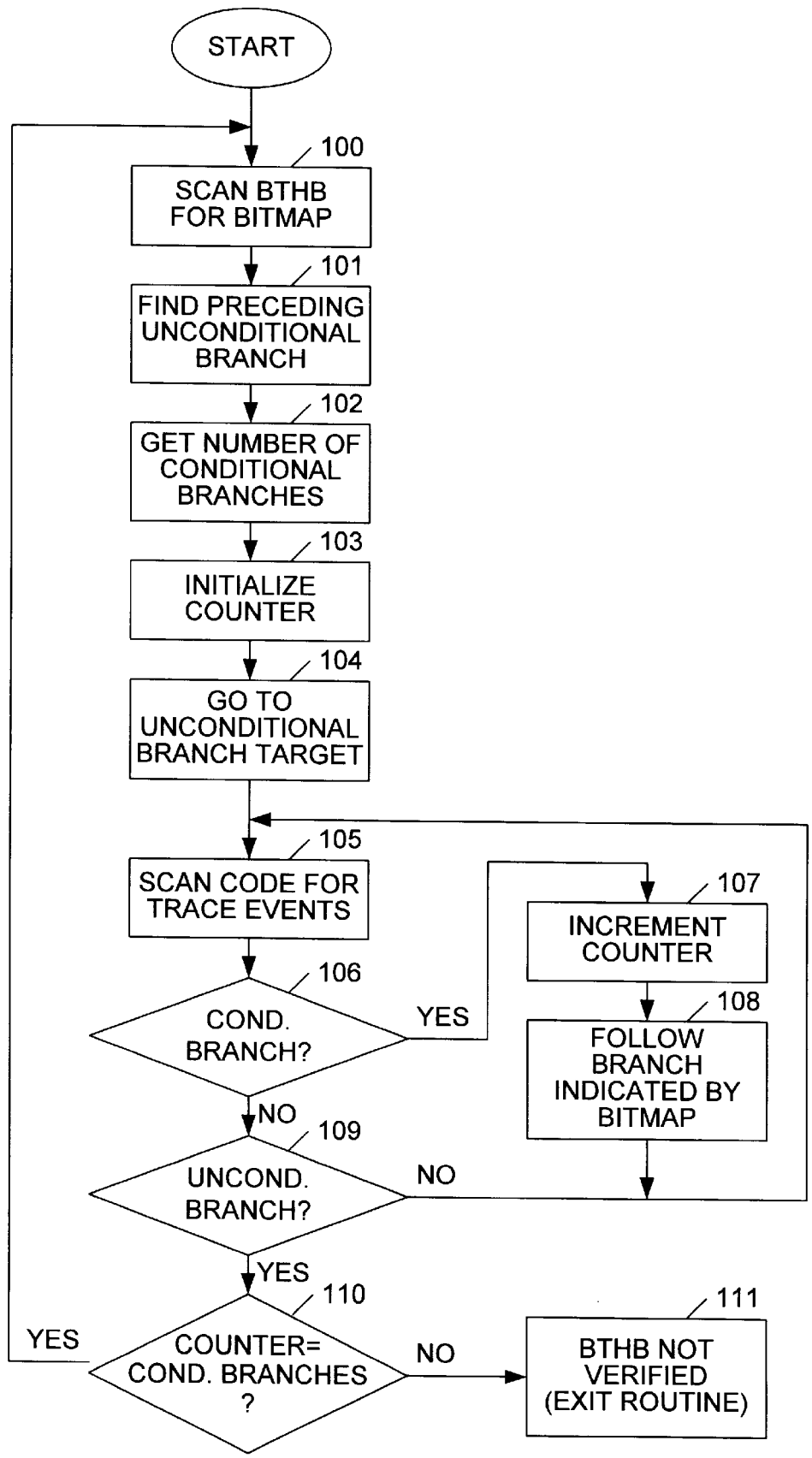
FIG. 5 is a flow diagram illustrating the verification of a section of the traced code in one embodiment of the invention.

The BTHB is checked against the program code one section at a time to verify that its contents are consistent with the code. The algorithm used in one embodiment to check one section of code against the BTHB contents is illustrated in FIG. 5. The figure shows the verification of the last section (in execution order) of the traced code. ("Execution order" as used herein means the order of instructions as they are executed. "Program order" as used herein means the order of the instructions as shown in a program listing.) The last section of code traced is therefore the first to be checked. Beginning with the last entry in the BTHB, the computer system scans through the BTHB entries in reverse order until a bitmap entry is found 100. This entry may be one of several consecutive bitmaps. The computer system then finds the unconditional branch entry which immediately precedes the bitmap entries 101. The computer system then determines how many conditional branches are represented by the bitmaps 102. A counter is then initialized 103. This counter will be used to store the number of conditional branches encountered in following the flow of the code as described below.

The entry for the unconditional branch includes a target address for an instruction which follows the unconditional branch. The computer system starts with this instruction 104 and follows the sequence of instructions in program order, determining whether each one would generate a trace entry 105 and, if so, what type of entry would be generated. When a conditional branch is found 106, a counter is incremented 107 and the branch is taken or not taken, as indicated by the corresponding bit in the corresponding bitmap entry 108. The computer system then proceeds to find the next entry-generating instruction 105. If an unconditional branch is encountered 109, the total number of conditional branches in that section of code is known. This number is compared to the number of conditional branches represented by the bitmaps 110. If the numbers match, the BTHB data is assumed to be accurate and the verification process contin-ues 100 with another section of code corresponding to a preceding set of bitmap data. If the numbers do not match, the BTHB data does not accurately reflect the sequence of execution of the instructions and the BTHB is disregarded 111.

When a section of the BTHB data has been verified, a preceding section (one or more bitmap entries between unconditional branch entries) is selected for verification. The new section is selected by again scanning the BTHB entries in reverse chronological order to find a new set of bitmap entries and a preceding unconditional branch entry. The same procedure described above is used to verify each section until the initial entry of the trace is reached.

An alternate embodiment may use entries other than unconditional branch entries to define the boundaries of a section in the BTHB. Since an address is needed to establish a starting point for the verification algorithm, the entries used should be those which include an instruction address. For example, in one embodiment, an entry for a system management interrupt includes the address of the next sequential instruction to be executed following the interrupt. This entry could therefore be used to establish an initial instruction in a section of code for comparison with a corresponding section of the BTHB. For the purposes of this disclosure, the BTHB entries which include an instruction address can be collectively referred to as address-entries.

Figure 6:
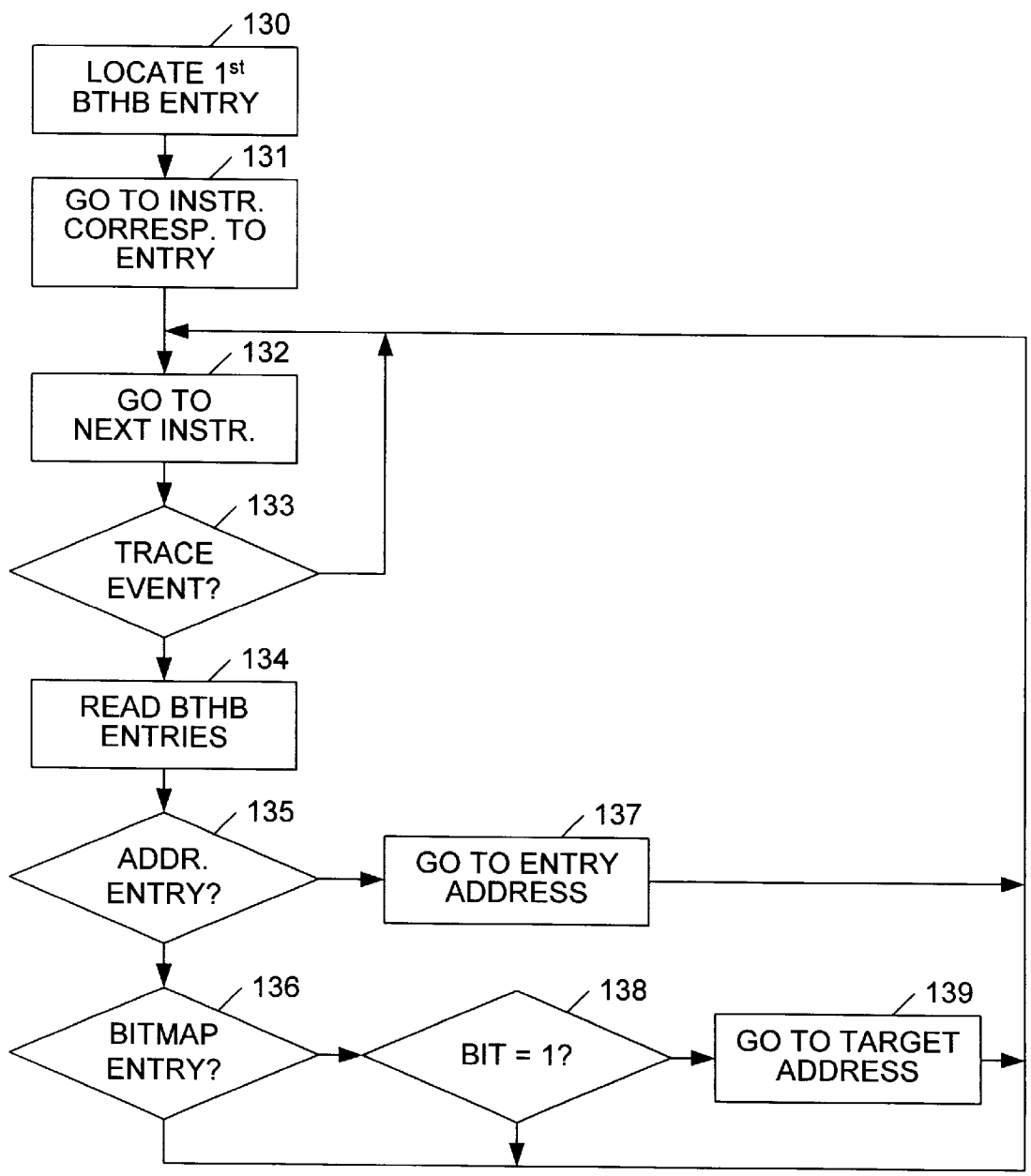
FIG. 6 is a flow diagram illustrating the algorithm used in one embodiment to determine the sequence of execution of the instructions in the test program.

Referring to FIG. 6, a flow diagram illustrating the algorithm used to determine the sequence of execution of the instructions in the test program is shown. The BTHB contents are scanned by the debug software to locate an initial unconditional branch entry 130. This entry is recorded in the BTHB when tracing is begun. The initial BTHB entries includes an address which is the location of the first instruction to be traced and therefore provides a starting point for the reconstruction of the sequence of execution of the instructions in the test code. The code flow begins with the instruction at this address 131. From this starting point, the instructions of the test code are scanned in program order 132,133 until an instruction which would generate a whole or partial entry (i.e., a trace event) is encountered. When such an instruction is found, the debug software checks the BTHB entries to determine the effect of the instruction 134–136. In one embodiment, the debug software determines what type of entry would be generated by each trace event and compares of this with the type of the corresponding entry in the BTHB. If the types do not match, then the instruction and the entry do not correspond to each other hand an error condition exists.

If the BTHB entry is an address entry, the debug software reads the address from the entry and goes to the address 137. The instructions of the test code are then scanned in program order from this new address until another trace event is encountered 132, 133. If the entry is a bitmap entry, the debug software determines whether the next bit in the entry is a one or a zero 138. If the bit is a zero, scanning of the instructions of the test code continues with the next instruction in program order following the trace event instruction 132. If the bit is a one, the debug software determines a target address corresponding to the trace event and goes to the instruction at that location 139. The test code instructions are then scanned in program order from that point 132. As explained above, some trace events generate neither address entries nor bitmap entries. For example, an instruction which results in a change to the GDTR will cause an entry containing the new value of the GDTR to be recorded. Although not shown in the figure, when the debug software encounters one of these events, the appropriate values will be recorded to allow proper interpretation of addresses corresponding to other entries. The execution of the instructions and the test code, however, simply continues with the instruction following the trace event in program order.

If the entry checked by the debug software is a bitmap entry, the software reads the next bit in the bitmap. This bit corresponds to the trace event. If the previous trace event was not a conditional branch (which would generate a bitmap entry) then the current trace event would correspond to the first bit in the bitmap. The same would be true if the previous trace event was a conditional branch corresponding to the last bit in the preceding bitmap entry. If the previous trace event was a conditional branch which did not generate the last bit in a bitmap, the bit corresponding to the current trace event will be in the same bitmap rather than one in a separate entry.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method for determining the sequence of execution of instructions in a program using trace data which corresponds to a plurality of trace events, wherein said trace data comprises one or more bitmap entries and one or more address entries, each said bitmap entry being indicative of whether one or more conditional branches were taken, said address entries each specifying an address corresponding to one of said instructions, the method comprising:
    (a) reading an initial address from an initial one of said address entries, said initial address corresponding to a first instruction;
    (b) reading said initial instruction;
    (c) determining whether said next instruction is a trace event;
    (d) if said initial instruction is not a trace event, reading the next instruction in program order;
    (e) if said initial instruction is a trace event, reading a corresponding entry in said trace data;
    (f) if said trace event is a branch, determining a next instruction from said initial instruction and said corresponding entry; and repeating steps (a)–(f) to determine the remainder of the sequence of execution.

2. The method of claim 1 wherein said branch is one of the group of instructions consisting of conditional branches, unconditional branches, calls, returns, jumps and interrupts.

3. The method of claim 1 wherein if said trace event is a conditional branch and said corresponding entry is a bitmap entry, determining whether said conditional branch is taken by reading a corresponding bit in said bitmap entry.

4. The method of claim 3 wherein if said trace event is an unconditional branch and said corresponding entry is an address entry, determining said next instruction by reading an address from said address entry.

5. A system for determining a sequence of execution of a plurality of instructions on a computer under test, said instructions forming a plurality of basic blocks, said computer under test generating trace data upon execution of said plurality of instructions and storing said trace data, the system comprising:
    (a) a trace data storage configured to store a plurality of entries, one or more of said entries comprising bitmap entries, each said bitmap entry comprising a bitmap indicative of whether a series of conditional branches were taken, one or more of said entries comprising address entries, each said address entry comprising an address of one of said plurality of instructions
    (b) an instruction storage for storing said plurality of instructions
    (c) a microprocessor coupled to said trace data storage and said instruction storage and configured to
        (i) locate an initial entry in said trace data storage, said initial entry comprising an address entry;
        (ii) determine an initial instruction corresponding to an address in said initial entry, said initial instruction corresponding to one of said basic blocks;
        (iii) examine in program order each subsequent instruction in said one of said basic blocks until a last instruction in said one of said basic blocks is located;
        (iv) locate an entry in said trace data corresponding to said last instruction;
        (v) determine a next instruction in a next one of said basic blocks according to said entry corresponding to said last instruction; and
        (vi) repeat steps (i)–(v).

6. The system of claim 5 wherein said microprocessor is configured to determine said next instruction by reading an address in said entry if said entry is one of said address entries and by reading a bit from a bitmap in said entry if said entry is one of said bitmap entries.

7. The system of claim 5 wherein if said bit is a 1 said last instruction is a conditional branch which was taken and if said bit is a 0 said last instruction is a conditional branch which was not taken.

8. The system of claim 7 wherein if said last instruction is a conditional branch which was taken, said next instruction is determined by a target address in said conditional branch and wherein if said last instruction is a conditional branch which was not taken, said next instruction is an instruction which follows said last instruction in program order.

9. A method for determining a sequence of execution of a plurality of instructions from trace data, a portion of said instructions representing trace events, said trace events including conditional branches and unconditional branches, said trace data including address entries and bitmap entries corresponding to said trace events, the method comprising:
    (a) locating an instruction which represents one of said trace events;
    (b) if said one of said trace events is one of said unconditional branches, locating a corresponding one of said address entries, determining a target address and proceeding to one of said instructions located at said target address;
    (c) if said one of said trace events is one of said conditional branches, locating a corresponding bit in a corresponding one of said bitmap entries, determining from said bit whether said one of said conditional branches was taken, and
        (i) if said one of said conditional branches was taken, determining a target address and proceeding to one of said instructions located at said target address, and
        (ii) if said one of said conditional branches was not taken, proceeding to a next one of said instructions which immediately follows said one of said conditional branches in program order.

10. The method of claim 9 further comprising:
    (d) if said trace event is a change to a register, proceeding to a next instruction which immediately follows said instruction representing said trace event in program order.

11. The method of claim 10 further comprising recording a new value stored in said register as a result of said trace event.

12. The method of claim 9 further comprising repeating steps (a)–(c).

13. The method of claim. 9 wherein said locating said corresponding address entry comprises locating a next entry.

14. The method of claim 13 wherein

- if a previous trace event is not one of said plurality of conditional branches, said corresponding bitmap entry is a next entry and said corresponding bit is a first bit in said bitmap;
- if a previous trace event is one of said plurality of conditional branches and a previous bit corresponding to said previous trace event is a last bit in a corresponding previous bitmap, said corresponding bitmap entry is a next entry and said corresponding bit is a first bit in said bitmap; and
- if a previous trace event is one of said plurality of conditional branches and said previous bit corresponding to said previous trace event is not said last bit in said corresponding previous bitmap, said corresponding bitmap is said previous bitmap and said corresponding bit is a next bit in said corresponding bitmap.

15. The method of claim 9 wherein said locating said one of said instructions which represents one of said trace events comprises:

- (i) examining one of said instructions to determine whether said one of said instructions represents one of said trace events;
- (ii) if said one of said instructions does not represent one of said trace events, examining a next one of said instructions in program order to determine whether said one of said instructions represents one of said trace events; and
- (iii) repeating (ii) until said one of said instructions which represents one of said trace events is located.

* * * * *